United States Patent [19]

Schaloske et al.

[11] 3,782,316

[45] Jan. 1, 1974

[54] ACTUATING DEVICE FOR SUBMARINE VEHICLES

[75] Inventors: Peter Schaloske, Oberhausen-Sterkr; Erich Maurer, Oberhausen, both of Germany

[73] Assignee: Deutsche Babcock & Wilcox Aktiengesellschaft, Oberhausen/Rhld., Germany

[22] Filed: Nov. 3, 1971

[21] Appl. No.: 195,179

[30] Foreign Application Priority Data
Dec. 22, 1970 Germany.................. P 20 63 059.5

[52] U.S. Cl................ 114/16 R, 61/69 R, 73/170 A
[51] Int. Cl.............................................. B63g 8/00
[58] Field of Search............. 114/16 R, 16 G, 16 E; 61/69; 73/170 A; 105/48

[56] References Cited
UNITED STATES PATENTS

| | | | |
|---|---|---|---|
| 3,418,818 | 12/1968 | Vincent et al. | 114/16 R X |
| 1,879,735 | 9/1932 | D'Albay | 114/16 R |
| 3,504,648 | 4/1970 | Kriedf | 114/16 R |
| 3,555,834 | 1/1971 | Weston | 114/16 R X |
| 861,101 | 7/1907 | Finch | 105/48 |

Primary Examiner—Duane A. Reger
Assistant Examiner—Galen L. Barefoot
Attorney—Allison C. Collard

[57] ABSTRACT

An actuating device for submarine vehicles in which power to control the vehicle is provided by apparatus responsive to the surrounding water pressure. At least one control cylinder, coupled to a wheel of the vehicle by a gear system, and at least one operating cylinder, coupled to a valve by a piston rod, are fluidly coupled together by a plurality of hose or pipe lines which selectively admit ocean-water surrounding the vehicle to the operating and control cylinders to control movement of the vehicle.

6 Claims, 1 Drawing Figure

PATENTED JAN 1 1974
3,782,316
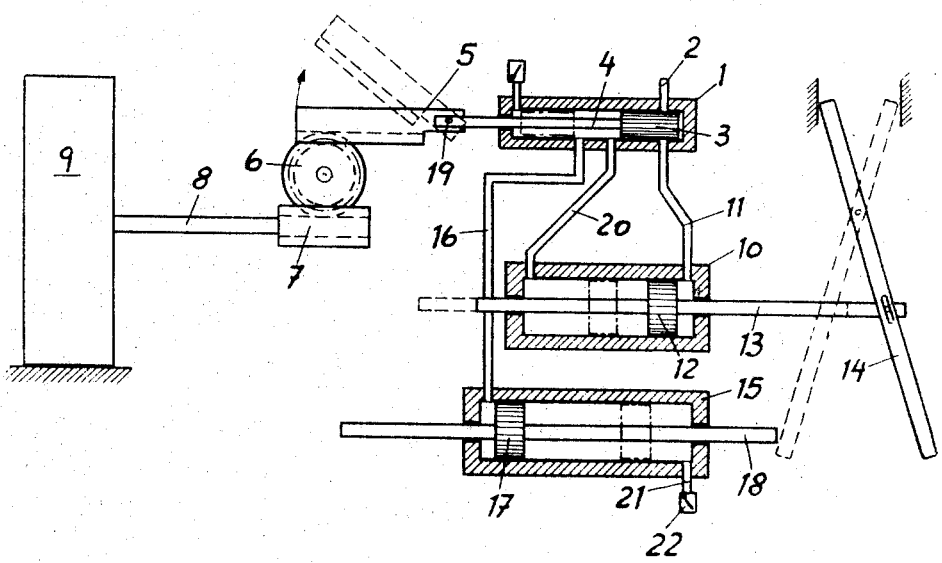
INVENTORS.
Peter Schaloske
Erich Maurer
By [signature]
Attorney

ACTUATING DEVICE FOR SUBMARINE VEHICLES

The present invention relates to an actuating device for submarine vehicles.

In the very near future, submarine vehicles will be used at depths of more than 5,000 meters. The water pressure of about 500 atmospheres at this depth presents many problems. One particular problem is the supply of energy in the submerged vehicle. Since this is a difficult problem to overcome, only vehicles which are dragged by lines are used. These lines are disadvantageous in that they must be provided with actuating means to control the movement of the vehicle.

It is therefore an object of the present invention to provide a simple and operable actuating device for submarine vehicles in which the power to control the vehicle is provided by the pressure of the surrounding ocean water.

Accordingly, the present invention provides an actuating device having at least one control and one operating cylinder. Connecting lines, coupled to the control cylinder, are closed to the surrounding ocean water and operating cylinder by a control piston. The piston of the control cylinder is coupled to a control device, so that during the submerging of the vehicle the control piston closes the feed line submerged in the ocean water. At the same time, the operating cylinder is subjected to atmospheric pressure. When the submerged vehicle reaches the desired depth, the control piston is moved by the control device in the desired direction. Thus, the necessary supply of ocean water and surrounding pressure are opened to the operating cylinder, and the operating piston is moved with respect to the submerged vehicle by a piston rod to move the vehicle.

The actuating device of the present invention is simple and operates flawlessly. The size of the operating cylinder depends on the depth of the water and the force which is required to operate the cylinder.

The control device for the control piston is preferably a piston rod having gear teeth which is moved by a gear which is coupled to the wheel of the submerged vehicle. Thus, the control impulse is generated independently from the path travelled by the submerged vehicle.

The operating cylinder or cylinders are preferably provided with a connecting jacket, which is coupled to the surrounding ocean water, and return valve which is mounted in the connecting jacket. Equal pressure volume is thus maintained on the left and the right side of the operating cylinder.

It is also an object of the present invention to provide an actuating device for submarine vehicles which is simple in design, easy to manufacture, and efficient and reliable in operation.

Other objects and features of the present invention will become apparent from the following detailed description taken in connection with the accompanying drawing. It is to be understood, however, that the drawing is intended for the purpose of illustration only, and not as a definition of the limits and scope of the invention.

Referring to the drawing, a schematic diagram of an actuating device constructed in accordance with the present invention, there is shown a connecting hose or pipe line 2, surrounded by and open to the ocean water and coupled to a control cylinder 1. Connecting line 2 is sealed by a control piston 3 in the position shown. Piston rod 4 is coupled to a rod 5, having gear teeth which engage a gear 6. Gear 6 is driven by a worm gear 7, which is coupled to an axle 8 and wheel 9 of the submerged vehicle. Another connecting hose or pipe line 11 is disposed at the same level as line 2, and couples the control and operating cylinders. An operating piston 12 is disposed within operating cylinder 10, and is coupled to a piston rod 13, and a valve lever 14 which is actuated by the piston rod. An operating cylinder 15 is also provided which is coupled to control cylinder 2 by a hose or pipe line 16. Operating piston 17 of operating cylinder 15 is actuated by a piston rod 18, in response to the retraction of valve lever 14 after a selected period of time. The valve lever is moved in response to movement of operating piston 12.

During the submerging operation, control piston 3 is positioned as shown in the drawing, and closes connecting line 2. The operating pistons are also positioned as shown in the drawing, and the operating cylinders are subjected to atmospheric pressure. When the submerged vehicle reaches the bottom of the ocean floor, wheel 9 starts turning. Rod 5, which may engage gear 6 before the vehicle submerges, is moved as soon as wheel 9 starts turning. Alternatively, the rod 5 may be coupled to the wheel, for example, by an electric impulse, an echo sounding device, or an advanced number of revolutions of wheel 9. For this reason, the rod is pivotably mounted at one end on a horizontal axis 19 on piston rod 4 of control piston 3.

The movement of rod 5 moves control piston 3, and couples lines 2 and 11. Operating piston 12 is then moved into the position indicated by the dotted lines to activate valve lever 14. Further movement of control piston 3 also opens line 20 which leads to operating cylinder 10, to create equal pressure on both sides of operating piston 12. As the piston moves further back, feed line 16 is opened and pressure is admitted to operating cylinder 15, which causes operating piston 17 to move to the position shown by the dotted lines in the drawing. A return valve 22 coupled to cylinder 15 by means of line 21 is used to prevent ocean water from falling into operating cylinder 15 during the submerging operation.

The setting of the pistons to their original positions is accomplished after the inventive arrangement has again been brought up to the surface. At the surface, resetting is accomplished. Thus, once the pistons are raised from underwater to the surface of the water, the water within the cylinders may be readily expelled and the pistons reset. When the apparatus is brought to the surface, it is not required to overcome the high pressures prevailing underwater.

The inventive design is an actuator which actuates element 14 while underwater. Element 14 may be a slide or lever of a valve, or it may for example, be a hatch of an underwater vehicle or a sea floor sampling device. Thus, it may be desirable to open a hatch after the vehicle or sampling device has come to rest on the submerged floor. In that event, piston 12 would be extended, and hatch 14 or element 14 would be actuated. After a sample of the submerged floor has been taken, it may be desirable to reclose the hatch. Piston 17 would then be displaced to actuate the element 14 to its closed position. Once the pistons 12 and 17 have been displaced underwater, they remain in their displaced positions until the cylinders are raised to the surface. The cylinders are then reset as described above. As many operating cylinders are required as the number of actuating motions to be executed since the inventive arrangement is limited to being adapted for only one cycle. Resetting does not take place until the arrangement has surfaced.

While only a single embodiment of the present invention has been shown and described, it will be apparent to those persons skilled in the art that many changes and modifications may be made thereunto without departing from the spirit and scope of the invention.

What is claimed is:

1. An underwater actuator arrangement comprising in combination:
    wheel means movable underwater on submerged floor means;
    a hydraulic control cylinder having a control piston linked to said wheel means and positioned with the movement of said wheel means;
    at least one operating cylinder having a slidable operation actuator piston;
    a plurality of hydraulic lines interconnecting said control cylinder and said operating cylinder, said actuator piston being operated when said control piston is at a predetermined position within said control cylinder, said actuator piston being operated by water under pressure admitted into said operating cylinder from said control cylinder through said hydraulic interconnection lines;
    an elongated rod having gear teeth provided thereon and pivotably coupled at one end to the piston rod of said control cylinder;
    a gear wheel rotatably mounted for engaging said teeth on said elongated rod; and
    a worm gear mounted on the axle of said wheel means disposed adjacent and engaging said gear wheel for transmitting movement of said wheel means to said control cylinder when said elongated rod engages said gear wheel.

2. The arrangement as recited in claim 1 further comprising a second operating cylinder, a pipeline coupling said second operating cylinder to said control cylinder, said second cylinder including a piston having an elongated piston rod extending therefrom for executing a return actuating movement in conjunction with said first operating cylinder.

3. The arrangement as recited in claim 2, wherein said second operating cylinder and said control cylinder are provided with one-way outlet valves at one of the ends thereof for allowing the forced outflow of water from said cylinders during movement thereof.

4. The arrangement as recited in claim 3, wherein said first operating cylinder is coupled by a pair of pipelines to said control cylinder which form a pressure equalization coupling for said first cylinder when both lines are exposed to ocean water pressure by said control cylinder.

5. The arrangment as recited in claim 2, wherein said second operating cylinder operates the piston therein opposite to the direction of actuating motion of the piston in said first operating cylinder.

6. The arrangement as recited in claim 5, wherein said first and second operating cylinders are returned to their initial positions from their actuated positions after surfacing of said cylinders from underwater.

* * * * *